United States Patent
Son et al.

(10) Patent No.: US 10,205,184 B2
(45) Date of Patent: Feb. 12, 2019

(54) SYSTEM AND METHOD FOR CONTROLLING PERFORMANCE OF FUEL CELL STACK

(71) Applicant: Hyundai Motor Company, Seoul (KR)

(72) Inventors: Ik Jae Son, Gyeonggi-Do (KR); Yei Sik Jeon, Seoul (KR)

(73) Assignee: Hyundai Motor Company, Seoul (KR)

( * ) Notice: Subject to any disclaimer, the term of this patent is extended or adjusted under 35 U.S.C. 154(b) by 888 days.

(21) Appl. No.: 14/476,002

(22) Filed: Sep. 3, 2014

(65) Prior Publication Data

US 2015/0303500 A1    Oct. 22, 2015

(30) Foreign Application Priority Data

Apr. 10, 2014  (KR) .................. 10-2014-0042776

(51) Int. Cl.

| | | |
|---|---|---|
| *H01M 8/04* | (2016.01) | |
| *G05B 15/02* | (2006.01) | |
| *H01J 1/00* | (2006.01) | |
| *H01M 8/04537* | (2016.01) | |
| *H01M 8/04746* | (2016.01) | |
| *H01M 8/04223* | (2016.01) | |
| *H01M 8/04828* | (2016.01) | |

(52) U.S. Cl.
CPC ... *H01M 8/04559* (2013.01); *H01M 8/04231* (2013.01); *H01M 8/04238* (2013.01); *H01M 8/04753* (2013.01); *H01M 8/04835* (2013.01); *H01M 2250/20* (2013.01); *Y02T 90/32* (2013.01)

(58) Field of Classification Search
CPC ......... H01M 8/04753; H01M 8/04858; H01M 8/04865; H01M 8/0488; H01M 8/04231; H01M 8/04544; H01M 8/04552; H01M 8/04559; H01M 8/04746

See application file for complete search history.

(56) References Cited

U.S. PATENT DOCUMENTS

| | | | |
|---|---|---|---|
| 2008/0081235 A1* | 4/2008 | Yamaga | H01M 8/04007 429/429 |
| 2009/0023022 A1* | 1/2009 | Katsumata | H01M 8/04179 429/408 |
| 2013/0137007 A1* | 5/2013 | Lee | H01M 8/04798 429/444 |
| 2013/0323615 A1* | 12/2013 | Ishikawa | H01M 8/04089 429/431 |
| 2014/0154603 A1* | 6/2014 | Hashimoto | H01M 8/04119 429/432 |

FOREIGN PATENT DOCUMENTS

| | | |
|---|---|---|
| JP | 2006-040718 A | 2/2006 |
| JP | 2006-085959 A | 3/2006 |
| JP | 2007-103115 A | 4/2007 |
| JP | 2007-128778 A | 5/2007 |
| JP | 2009-123534 A | 6/2009 |
| JP | 2012-244721 A | 12/2012 |
| KR | 10-2009-0033272 | 4/2009 |
| KR | 10-2009-0126979 | 12/2009 |

\* cited by examiner

*Primary Examiner* — Stewart A Fraser
*Assistant Examiner* — Rachel L Zhang
(74) *Attorney, Agent, or Firm* — Mintz Levin Cohn Ferris Glovsky and Popeo, P.C.; Peter F. Corless (57) ABSTRACT

A system and method of controlling a performance of a fuel cell stack is provided. In particular, the output performance of the fuel cell stack is determined by comparing the difference between an initial voltage and a voltage after a predetermined time lapses with the difference between the initial voltage and a preset minimum voltage.

4 Claims, 6 Drawing Sheets

SYSTEM AND METHOD FOR CONTROLLING PERFORMANCE OF FUEL CELL STACK

CROSS-REFERENCE TO RELATED APPLICATION

The present application claims priority of Korean Patent Application Number 10-2014-0042776 filed on Apr. 10, 2014, the entire contents of which application are incorporated herein for all purposes by this reference.

BACKGROUND (a) Technical Field

The present invention relates to a system and method of controlling a fuel cell stack, and more particularly, to a system and method of controlling a fuel cell stack for recovering performance of the fuel cell stack.

(b) Background Art

Generally, a fuel cell vehicle is a vehicle that is powered by a fuel cell stack in which a plurality of fuel cells are stacked together to provide an appropriate amount in order to power the vehicle. These fuel cell systems typically include a fuel supplying system supplying hydrogen, (i.e., fuel or the like), to the fuel cell stack, an air supplying system supplying oxygen, (i.e., an oxidizing agent required for an electrochemical reaction), a water and heat managing system controlling a temperature of the fuel cell stack, and other components well known in the art.

The fuel supply system depressurizes the compressed hydrogen in a hydrogen tank and supplies the hydrogen to a fuel electrode (anode) of the fuel cell stack, and an air supply system supplies inhaled external air to an air electrode (cathode) of the fuel cell stack by operating an air blower.

When hydrogen is supplied to the fuel electrode of the fuel cell stack and oxygen is supplied to the air electrode thereof, hydrogen ions are separated through a catalytic reaction in the fuel electrode and the separated hydrogen ions are transferred to the air electrode as an oxidation electrode through electrolytic film. Here, the hydrogen ions separated from the fuel electrode, electrons and oxygen react together electro-chemically in the oxidation electrode to produce electricity. In more detail, hydrogen is electro-chemically oxidized in the fuel electrode and oxygen is electro-chemically reduced in the air electrode, electricity and heat are generated through the movements of electrons produced at that time, and water vapor or water is generated through a chemical reaction where hydrogen and oxygen are combined.

Meanwhile, an exhausting device is provided for discharging by-products such as water vapor, water and heat, which are produced while electricity is generated through the fuel cell stack, and non-reacted hydrogen, oxygen and the like. Gases such as water vapor, hydrogen, oxygen and the like are exhausted to the air through a discharging passage.

Here, configurations of an air blower, a hydrogen reflow blower, a water pump and the like for driving a fuel cell are coupled to a main bus terminal to easily turn on the fuel cell, and various relays for easily blocking and connecting electrical power and a diode to prevent reverse-current from flowing to the fuel cell may be connected to the main bus terminal.

Dry air supplied through an air blower is humidified through a humidifier and then is supplied to the cathode of a fuel cell stack, and the discharging gas from the cathode is transferred to a humidifier while it is humidified through water produced inside the fuel cell stack and may be used when humidifying the dry air to be supplied to the cathode by an air blower.

As is well known by those skilled in the art, fuel cell stacks are sensitive to the operation conditions such as external air temperature, cooling water temperature, current and the like and the state and performance thereof are determined based on these factors. As such, when a vehicle is continuously driven, especially in bad operation conditions, the performance of the fuel cell stack decreases and as a result reduces the output of the fuel cell stack. This affects the durability and deterioration of the fuel cell stack thereby shortening a life-span of the fuel cell stack in the long term.

Meanwhile, the dry out of the fuel cell stack is caused by two factors, one of which is caused at a high temperature output and the other of which is caused at a low output. The dry out at a high temperature output is caused when the heat balance inside the fuel cell stack is broken and the dry out at a low temperature is caused when the amount of water generation is reduced due to failed attempts to control the air supply and the optimal operating temperature, applying low current, and driving on free-load. Regardless, when the dry out of the fuel cell stack occurs, the output of the fuel cell stack is decreased and it takes long time to recover back to a normal output.

Furthermore, when the dry out of the fuel cell stack continues for a long time, the fuel cell system may not be able to recover due to unrecoverable performance reduction. Accordingly, the fuel cell stack needs to be controlled in manner that is able to sense promptly the situation where the fuel cell stack is in dry out state and operate the fuel cell stack to be recovered rapidly when the fuel cell stack is in a dry out state.

Further, even when the concentration of hydrogen is reduced due to its contamination when hydrogen is supplied as a fuel, the performance of the fuel cell stack may decrease. That is, when the output of the fuel cell stack is decreased, separate controls for the fuel cell stack due to the dry out and the hydrogen contamination are required.

The description provided above as a related art of the present invention is just for helping in understanding the background of the present invention and should not be construed as being included in the related art known by those skilled in the art.

SUMMARY OF THE DISCLOSURE

The present invention has been made in an effort to solve the above-described problems associated with the prior art and the object of the present invention is to provide a method of controlling performance of a fuel cell stack by analyzing the voltage of the fuel cell stack and as a result the performance is recovered in time to prevent damage or deterioration to the fuel cell.

More specifically, a method of controlling a performance of a fuel cell stack according to an embodiment of the present invention may include a step of determining an output performance of the fuel cell stack by comparing the difference between an initial voltage and a voltage after a predetermined time lapses with the difference between the initial voltage and a preset minimum voltage and recovering the performance of the fuel cell based on a determination that the performance is decreasing.

In particular, the exemplary system may be configured to determine the performance of the fuel cell stack after a predetermined time has lapsed. As such, the performance of the fuel cell stack is determined to be lower than a minimum required performance when the difference between an initial voltage and a voltage after a predetermined time has lapsed is greater than the difference between the initial voltage and a preset minimum voltage.

The method of controlling the performance of a fuel cell stack of the present invention may further include a step of operating the fuel cell stack at an increased pressure by increasing the pressures of hydrogen and air inside the fuel cell stack when a determination is made that the performance is lowered.

The method of controlling a performance of a fuel cell stack of the present invention may further include a first re-determining step of re-performing the determining step after operating the fuel cell stack at an increasing pressure for a preset time. That is, the analysis is continually or reiteratively performed so that the fuel cell stack is continuously monitored.

The method of controlling a performance of a fuel cell stack of the present invention may further include a step of controlling a purge of hydrogen from the fuel cell stack by increasing a purge amount of hydrogen and shortening a purge cycle of hydrogen when the difference between an initial voltage and a voltage after a predetermined time has lapsed is greater than the difference between the initial voltage and a preset minimum voltage in the first re-determining step.

The method of controlling a performance of a fuel cell stack of the present invention may further include a second re-determining step of re-performing the determining step after the purge control step.

The method of controlling a performance of a fuel cell stack of the present invention may further include a step of introducing air to a hydrogen recirculation line of the fuel cell stack when the difference between an initial voltage and a voltage after a predetermined time lapses is greater than the difference between the initial voltage and a preset minimum voltage in the second re-determining step.

The method of controlling a performance of a fuel cell stack of the present invention may further include a third re-determining step of re-performing the determining step after the air introduction step.

The system and method of controlling a performance of a fuel cell stack of the present invention may further include a step of purging a hydrogen storage reservoir in which the hydrogen to be supplied to the fuel cell stack is stored and recharging the hydrogen storage reservoir with new hydrogen when the difference between an initial voltage and a voltage after a predetermined time has lapsed is greater than the difference between the initial voltage and a preset minimum voltage in the third re-determining step.

BRIEF DESCRIPTION OF THE DRAWINGS

The above and other features of the present invention will now be described in detail with reference to certain exemplary embodiments thereof illustrated by the accompanying drawings which are given herein below by way of illustration only, and thus are not limitative of the present invention, and wherein.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The special configurations and functional descriptions are merely exemplary for describing the embodiments according to the present invention, and further the embodiments of the present invention may be replaced by various modifications, and thus should not be construed as limiting thereto.

The embodiments according to a concept of the present invention may be changed variously and have various types and thus the special embodiments will be illustrated in the drawings and described in the specification. However, the embodiments according to a concept of the present invention are not limited to the specifically disclosed types, and thus should be understood that they include all modifications and equivalents or replacements included within a spirit and a scope of the present invention.

Although terms like a first and a second are used to describe various components, but the components are not limited to these terms. These terms are used only to differentiate one component from another one, for example, the first component can be referred to as the second component, or the second component can be referred to as the first component, without departing from the scope of the present invention.

It also should be understood that when it is stated that one component is "connected" or "coupled" to another component, even though the one component may be directly connected or coupled to another component, but there may be other components between them. However, it has to be understood that when it is stated that one component is "directly connected" or "directly coupled" to another component, there is no intermediate component between them. The terms used for describing a relation among other components, that is, "between", "right between, "adjacent to" or "directly adjacent to" have to be construed similarly.

The terminology used herein is for the purpose of describing particular embodiments only and is not intended to be limiting to the embodiments. As used herein, unless otherwise defined, the singular forms "a," "an" and "the" are intended to include the plural forms as well. Unless the context indicates otherwise, it will be further understood that the terms "comprises" and/or "having" when used in this specification, specify the presence of stated features, integers, steps, operations, elements, and/or components, but do not preclude the presence or addition of one or more other features, integers, steps, operations, elements, components, parts or combination thereof.

All terms including technical or scientific terminology used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Additionally, it is understood that the below methods are executed by at least one controller. The term controller refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes fuel cell hybrid vehicles, electric fuel cell vehicles, plug-in hybrid fuel cell electric vehicles, hydrogen-powered vehicles, and other fuel cell vehicles.

Hereinafter, reference numerals will now be made in detail to various embodiments of the present invention, examples of which are illustrated in the accompanying drawings and described below. In the drawings, the same reference numerals refer to the same components.

Figure 1:
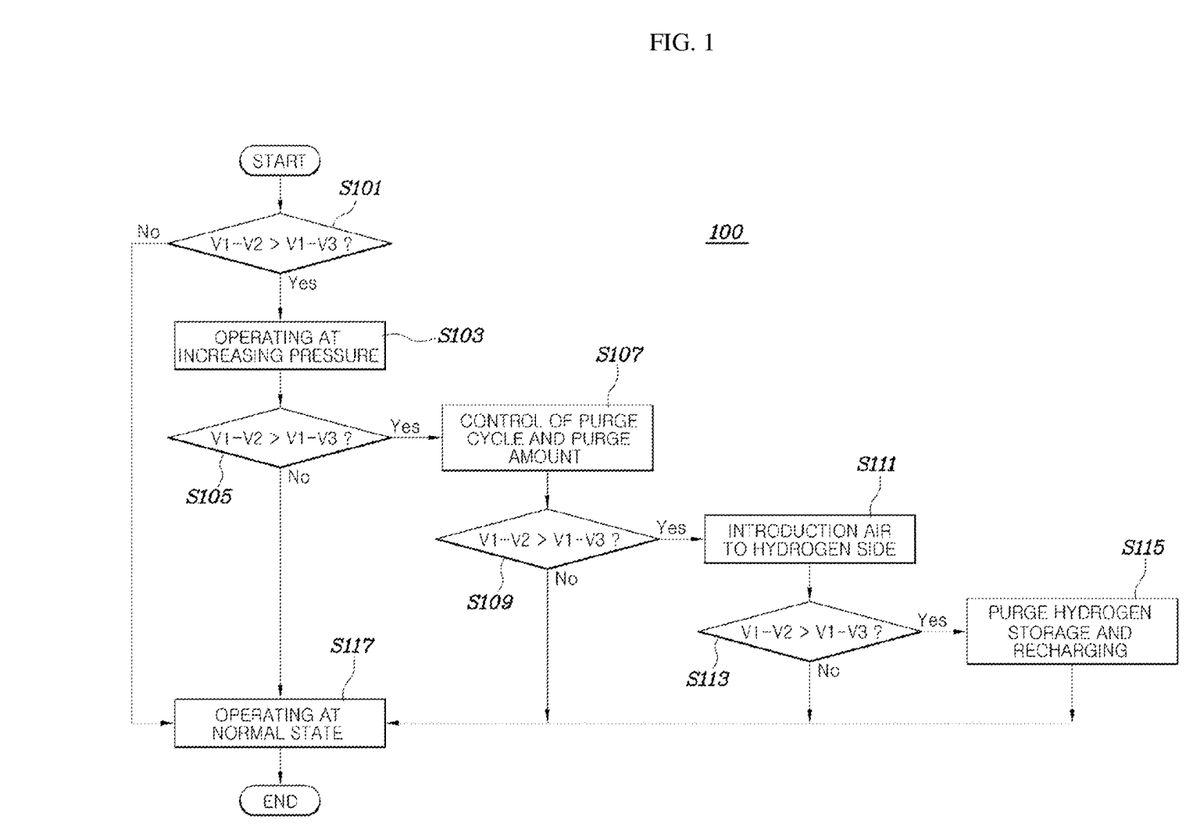
FIG. 1 is a flow chart illustrating a method of controlling the performance of a fuel cell stack according to an exemplary embodiment of the present invention.

FIG. 1 is a flow chart illustrating a method of controlling the performance of a fuel cell stack according to an exemplary embodiment of the present invention. A main agent for controlling performances of a fuel cell stack may be a controller (not shown) which wholly controls the fuel cell stack via a special purpose processor and memory specifically configured to control the fuel cell stack as described herein. In particular, the controller determines the output performance of the fuel cell stack by comparing the difference between an initial voltage V1 and a voltage V2 after a predetermined time has lapsed with the difference between the initial voltage V1 and a preset minimum voltage V3 S101.

Here, the initial voltage V1 of the fuel cell stack refers to a voltage right after turning on a vehicle (i.e., start up voltage), the preset minimum voltage V3 refers to a standard voltage a fuel cell stack right before it needs replacing, that is, a standard voltage at which it is time to replace the fuel cell stack. The controller determines that the output performance of the fuel cell stack is lower than the minimum required performance thereof when the difference between the initial voltage V1 of the fuel cell stack and the voltage V2 thereof after a fuel cell vehicle is operated for a predetermined period of time is greater than the difference between the initial voltage V1 of the fuel cell stack and the preset minimum voltage V3 by comparing the difference between the initial voltage V1 of the fuel cell stack and the voltage V2 thereof after a fuel cell vehicle is operated for a predetermined period of time with the difference between the initial voltage V1 of the fuel cell stack and the preset minimum voltage V3 S101. The decrease of the output performance may be caused from, for example, a dry out or contamination of the fuel cell stack.

Here, when the difference between the initial voltage V1 of the fuel cell stack and the voltage V2 thereof after a fuel cell vehicle has been operated for a predetermined period of time is greater than the difference between the initial voltage V1 of the fuel cell stack and the preset minimum voltage V3, the controller (not shown) is configured to control and does control the operation of the fuel cell stack to operate the fuel cell stack at an increased pressure by increasing the pressures of hydrogen and air inside the fuel cell stack S103. As a result, the dry out state of the fuel cell stack may be improved since an absolute humidity is decreased and a relative humidity is increased when the fuel cell stack is operated at an increased pressure.

Figure 2:
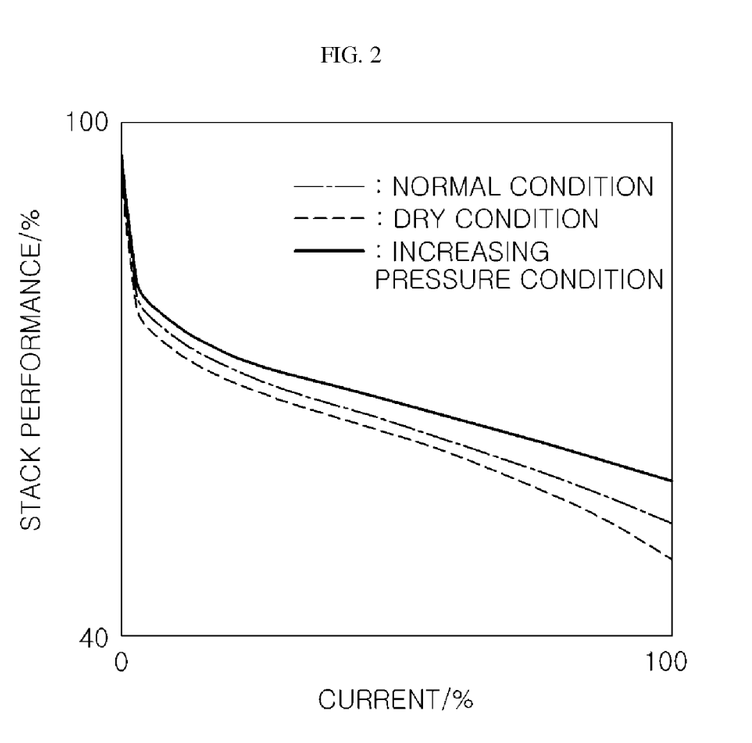
FIG. 2 is a graph illustrating the variation of the performance of a fuel cell stack in accordance with current variation at a normal condition, a dry condition and a pressurized condition.

FIG. 2 is a graph illustrating the variation of the performance of a fuel cell stack depending on current variations at a normal condition, a dry condition, and pressurized condition. As shown in FIG. 2, when the fuel cell stack is in the dry out state, the fuel cell stack is to be operated at an increased pressure thereby to improve the output performance thereof.

Meanwhile, after operating the fuel cell stack at an increasing pressure for a preset time, the controller may determine that the fuel cell stack is contaminated with CO poisoning when the difference between the initial voltage V1 of the fuel cell stack and the voltage V2 thereof after a fuel cell vehicle is operated for a predetermined period of time is still greater than the difference between the initial voltage V1 of the fuel cell stack and the preset minimum voltage V3 in spite of operating the fuel cell stack at an increased pressure by comparing the difference between the initial voltage V1 of the fuel cell stack and the voltage V2 thereof after a fuel cell vehicle is operated for a predetermined period of time with the difference between the initial voltage V1 of the fuel cell stack and the preset minimum voltage V3 S105.

Figure 3:
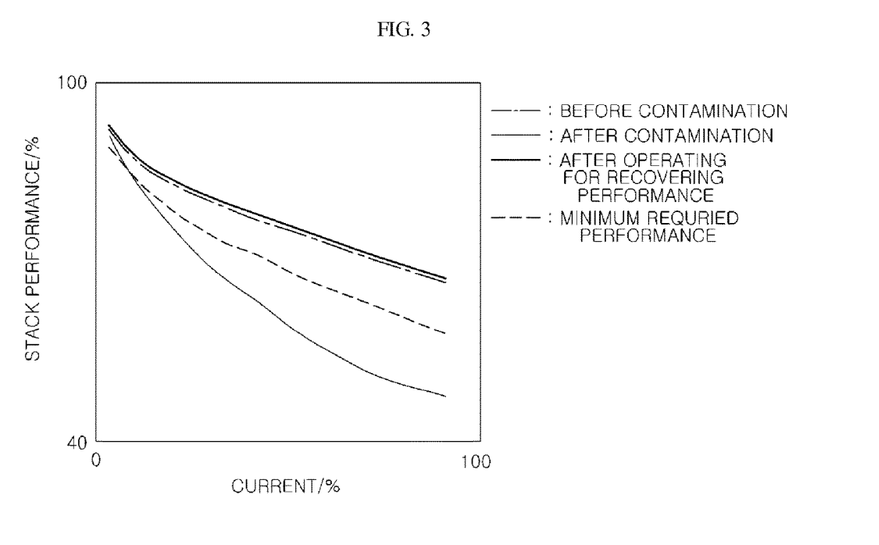
FIG. 3 is a graph illustrating the variation of the performance of a fuel cell stack in accordance with carbon monoxide (CO) concentration within hydrogen.

FIG. 3 is a graph illustrating the variation of the performance of a fuel cell stack depending on the CO concentration within hydrogen. Referring to FIG. 3, the post-contamination refers to a high CO concentration within hydrogen and the minimum required performance refers to the output performance of the fuel cell stack corresponding to the preset minimum voltage V3 wherein it is shown that the output performances of the pre-contamination and after operation to recover the performance are substantially similar and the output performance of the fuel cell stack after contamination is much lower than the output performance corresponding to the preset minimum voltage V3.

Figure 5:
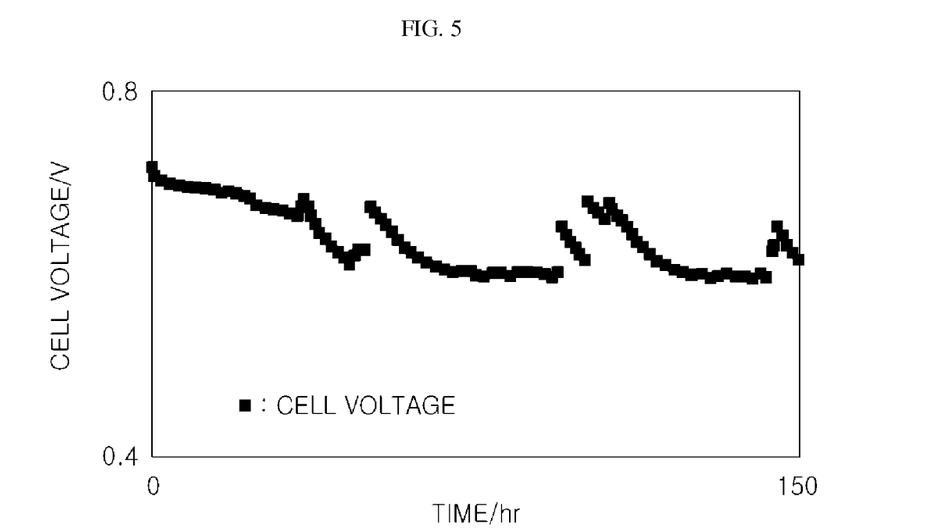
FIG. 5 is a graph illustrating voltage variations of a fuel cell stack when the fuel cell stack is static current-operated at a hydrogen concentration lower than a normal state.

Regarding to this, FIG. 5 is a graph illustrating the voltage variation of a fuel cell stack when the fuel cell stack is static current-operated at a hydrogen concentration lower than that at a normal state wherein it is shown that the voltage of a fuel cell is decreased gradually as time lapses when the hydrogen concentration is lower than that at a normal state due to CO poisoning.

The controller may control the purge cycle and the purge amount of hydrogen in order to improve the CO contamination S107. In more detail, the controller may decrease the purge cycle of hydrogen and increase the purge amount of hydrogen. That is, the hydrogen should be purged more frequently by decreasing the purge cycle of hydrogen, and more hydrogen should be purged by increasing the purge amount of hydrogen, so as to reduce the CO concentration within hydrogen poisoned with CO.

Figure 4A:
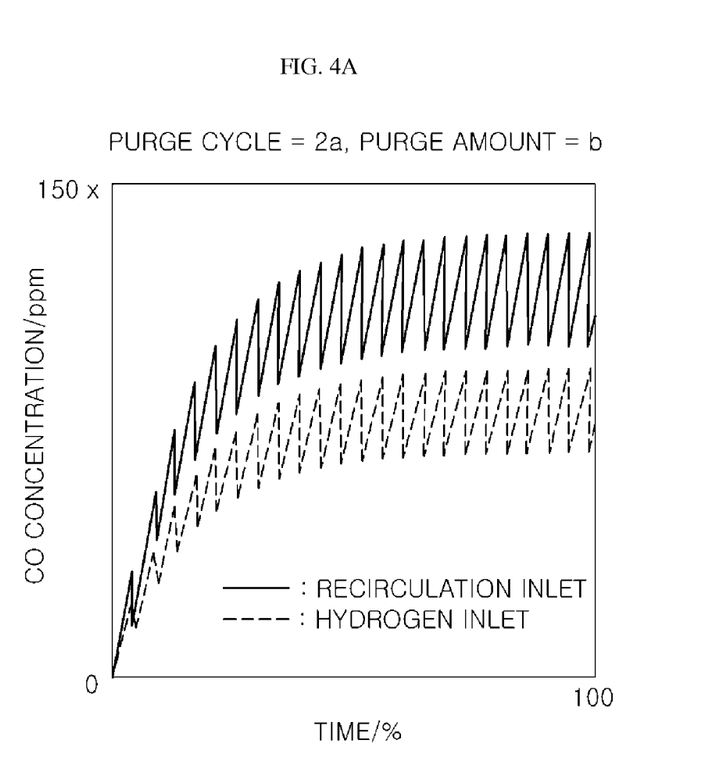
FIGS. 4A and 4B are graphs illustrating the variation of the CO concentration at an inlet of hydrogen and the variation of the CO concentration at an inlet of hydrogen recirculation system in accordance with a purge cycle and a purge amount, respectively.
Figure 4B:
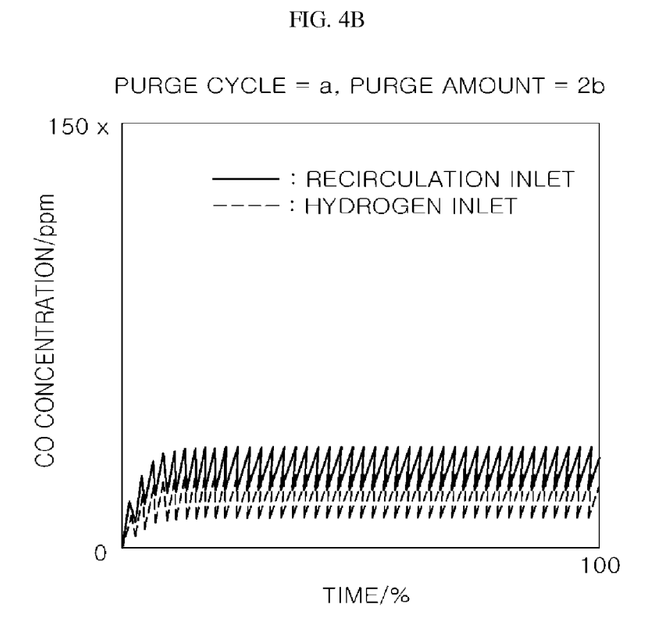

In this regard, FIGS. 4A and 4B are graphs illustrating the concentration variation of CO at the inlet of hydrogen and the concentration variation of CO at the inlet of hydrogen recirculation system in accordance with a purge cycle and a purge amount, respectively. As shown in FIGS. 4A and 4B, the CO concentrations at an inlet of hydrogen and an inlet of hydrogen recirculation system are decreased as time lapses when the purge cycle of hydrogen is reduced to a half and the purge amount of hydrogen is increased to two times.

That is, the controller may reduce the contamination of CO by increasing the amount of hydrogen that is purged and shortening the purge cycle of hydrogen (i.e., increasing the frequency) if the output performance of the fuel cell stack is still lower than the minimum required performance upon re-determining the state of the fuel cell stack despite the dry out state of the fuel cell stack being improved through operating the fuel cell stack at an increased pressure.

After reducing the CO concentration by increasing the amount of hydrogen purged and shortening the purge cycle of hydrogen, the controller may introduce air to a hydrogen recirculation line and induce carbon monoxide reduction by converting it into carbon dioxide S111 when the difference between the initial voltage V1 of the fuel cell stack and the voltage V2 thereof after a fuel cell vehicle operates for a predetermined period of time is greater than the difference between the initial voltage V1 of the fuel cell stack and the preset minimum voltage V3 in spite of increasing the amount of hydrogen purged and shortening the purge cycle by comparing again the difference between the initial voltage V1 of the fuel cell stack and the voltage V2 thereof after a fuel cell vehicle is operated for a predetermined period time with the difference between the initial voltage V1 of the fuel cell stack and the preset minimum voltage V3 S109.

Figure 6:
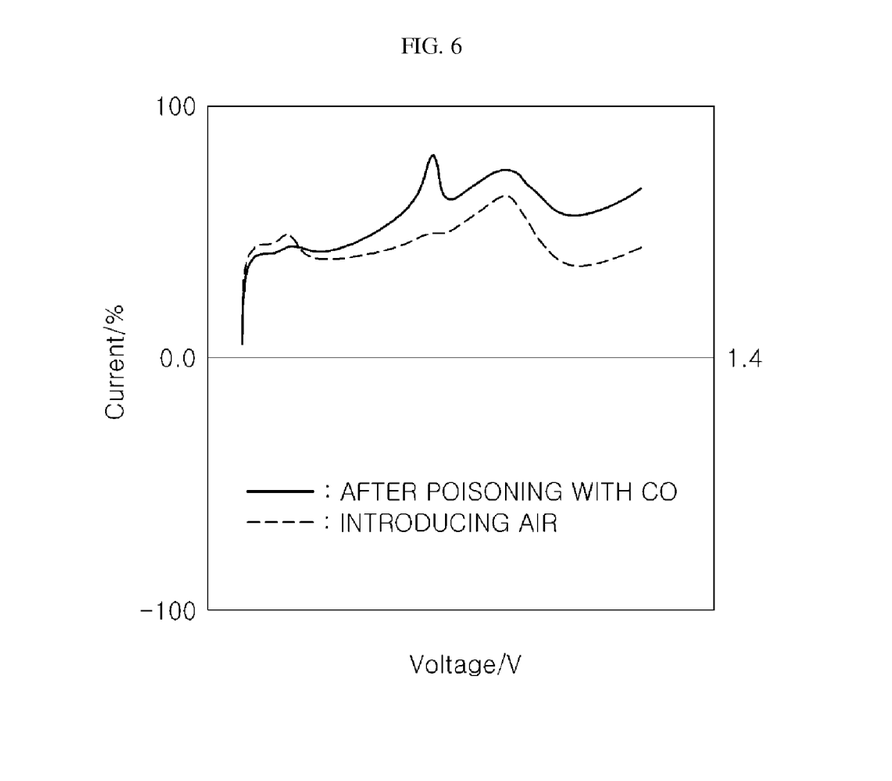
FIG. 6 is a graph illustrating variations of current and voltage at a poisoning state of CO and at a state of air introduction to a hydrogen side.

In this regard, FIG. 6 is a graph illustrating variations of current and voltage at the poisoning state of CO and at the state of air introduction to a hydrogen side. Referring to FIG. 6, it is shown that the variations of current and voltage at the state of CO poisoning and after the introduction of air are different, respectively.

After removing carbon monoxide as a contaminant by introducing air to the hydrogen recirculation line, the controller may purge all hydrogen stored in the hydrogen storage reservoir of a hydrogen tank and recharge the reservoir with new hydrogen S115 when the difference between the initial voltage V1 of the fuel cell stack and the voltage V2 thereof after a fuel cell vehicle drives for the predetermined period of time is greater than the difference between the initial voltage V1 of the fuel cell stack and the preset minimum voltage V3 by comparing again the difference between the initial voltage V1 of the fuel cell stack and the voltage V2 thereof after a fuel cell vehicle drives for the predetermined period of time with the difference between the initial voltage V1 of the fuel cell stack and the preset minimum voltage V3 S113.

According to a system and method of controlling a performance of a fuel cell stack according to an embodiment of the present invention, the reasons for decreasing the performance of the fuel cell stack can easily be determined and the above system and method can control the system to increase the performance of the fuel cell stack in based on the determined reasons for the decrease in performance thereby making it possible to recover rapidly the performance of the fuel cell stack.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of controlling a performance of a fuel cell stack, comprising:
   waiting, by a controller, for a period of time to lapse;
   once the period of time has lapsed, determining, by the controller, an output performance of the fuel cell stack by comparing the difference between an initial voltage and a voltage after the period of time has lapsed with the difference between the initial voltage and a preset minimum voltage;
   determining, by the controller, whether the output performance is decreasing;
   in response to the output performance decreasing, determining, by the controller, based on the comparison why the performance is decreasing;
   executing, by the controller, processes to increase the performance of the fuel cell stack;
   operating, by the controller, the fuel cell stack at an increased pressure by increasing a hydrogen pressure and an amount of air inside the fuel cell stack based on the determining result;
   re-performing, by the controller, the determining step as a first re-determining step after operating the fuel cell stack at the increased pressure for an additional period of time;
   controlling, by the controller, a purge by increasing a purge amount of hydrogen and shortening a purge cycle of hydrogen when the difference between the initial voltage and the voltage after the period of time has lapsed is greater than the difference between the initial voltage and the preset minimum voltage in the first re-determining step;
   re-performing, by the controller, the determining step as a second re-determining step after the purge control step; and
   introducing, by the controller, air to a hydrogen recirculation line of the fuel cell stack during a supply of hydrogen into the fuel cell stack when the difference between the initial voltage and the voltage after the additional period of time has lapsed is greater than the difference between the initial voltage and a preset minimum voltage in the second re-determining step,
   wherein carbon monoxide in the fuel cell stack is converted into carbon dioxide by introducing air to the hydrogen recirculation line.

2. The method of controlling a performance of a fuel cell stack of claim 1, further comprising:
   determining, by the controller, that the performance of the fuel cell stack after the period of time has lapsed is lower than a minimum required performance when the difference between an initial voltage and a voltage after the period of time has lapsed is greater than the difference between the initial voltage and a preset minimum voltage.

3. The method of controlling a performance of a fuel cell stack of claim 1, further comprising a third re-determining step of re-performing the determining step after the air introduction step.

4. The method of controlling a performance of a fuel cell stack of claim 3, further comprising purging a hydrogen storage reservoir in which the hydrogen to be supplied to the fuel cell stack is stored and recharging the hydrogen storage reservoir with new hydrogen when the difference between an initial voltage and a voltage after the period of time has lapsed is greater than the difference between the initial voltage and a preset minimum voltage in the third re-determining step.

* * * * *